UNITED STATES PATENT OFFICE.

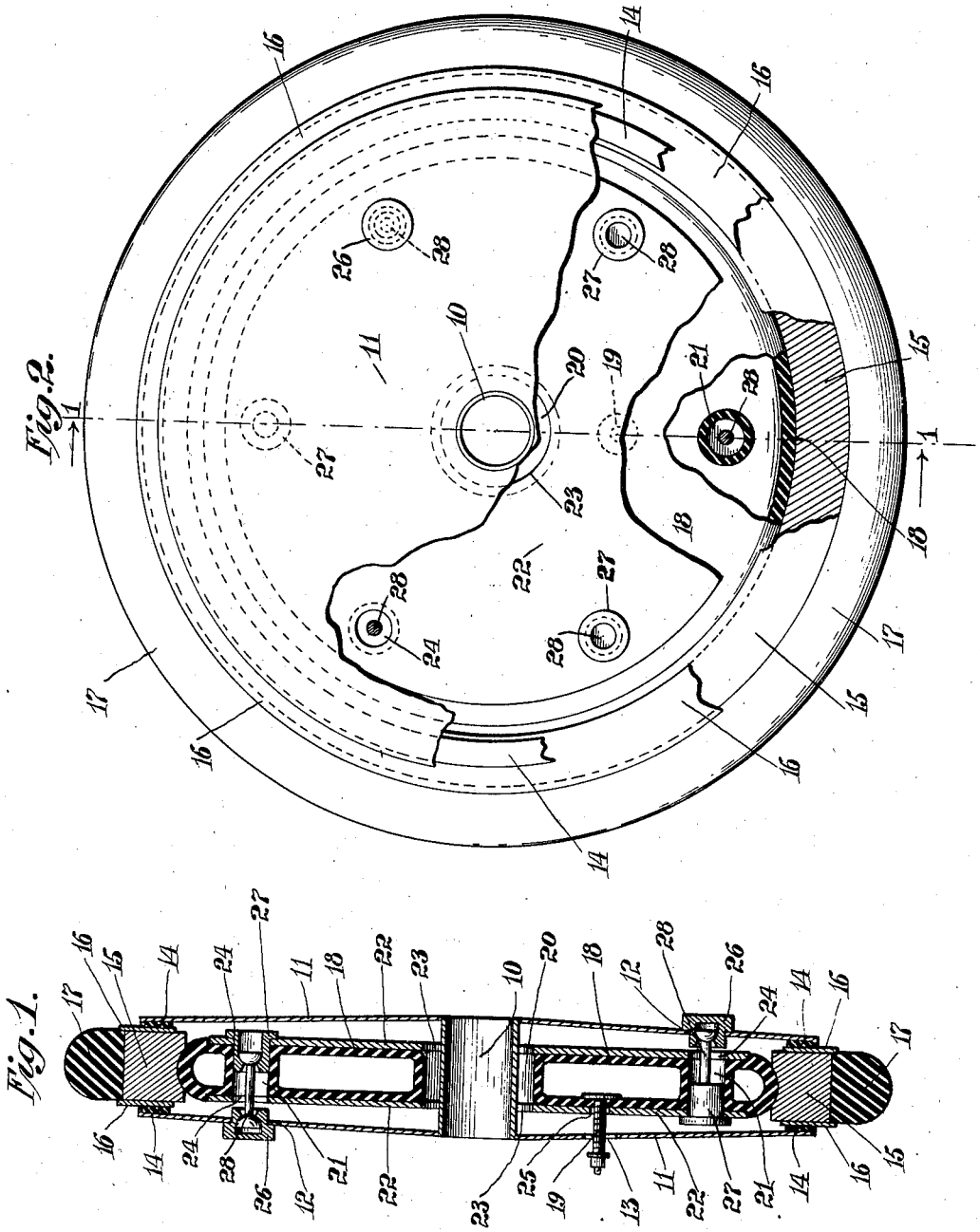

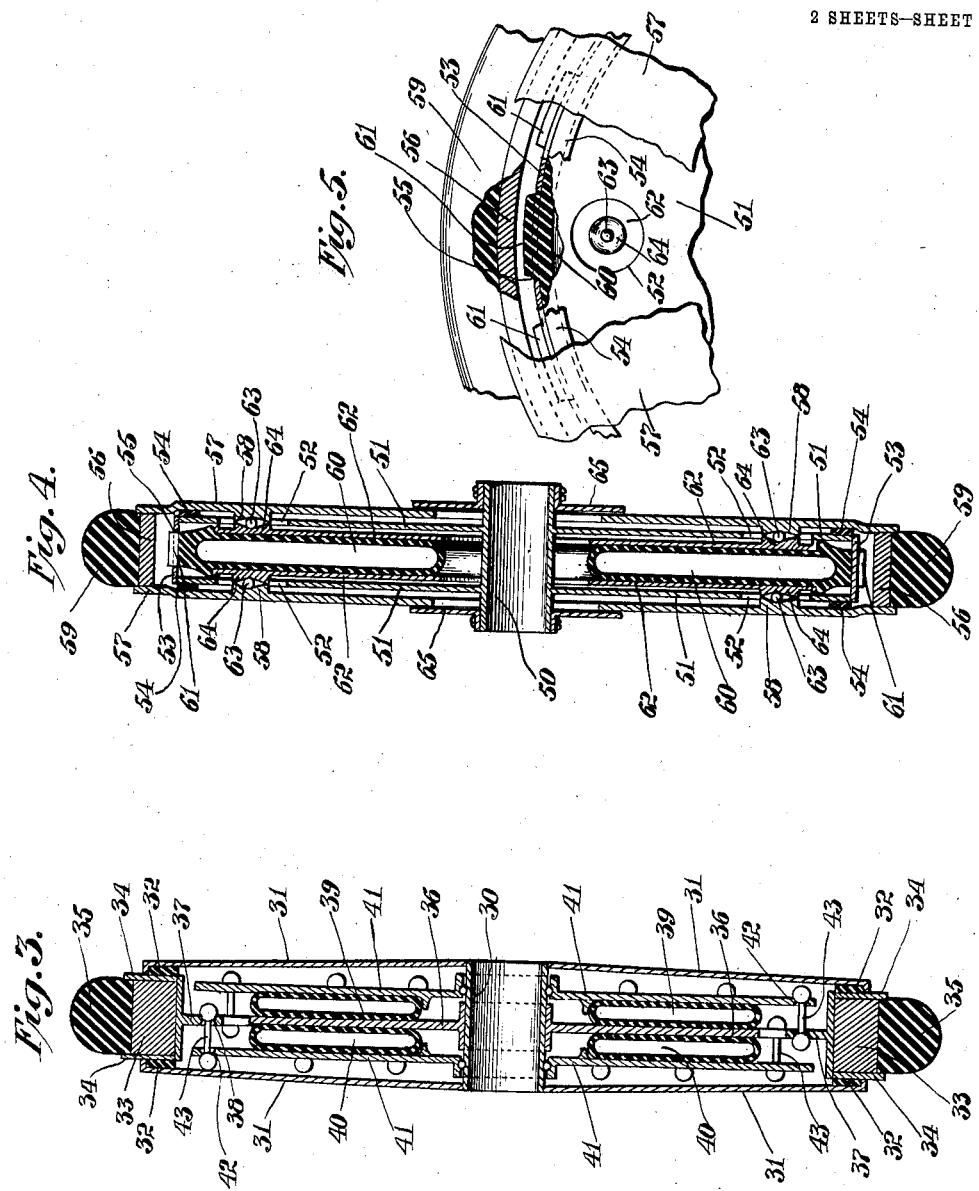

RALPH K. GRATIGNY, OF EDGEWATER, NEW JERSEY.

VEHICLE-WHEEL.

1,079,644.  Specification of Letters Patent.  Patented Nov. 25, 1913.

Application filed July 5, 1912. Serial No. 707,652.

*To all whom it may concern:*

Be it known that I, RALPH K. GRATIGNY, a citizen of the United States, residing at Edgewater, in the county of Bergen and State of New Jersey, have invented certain new and useful Improvements in Vehicle-Wheels, of which the following is a specification.

My invention relates to vehicle wheels and has for its object to improve the construction of wheels of the type used for motor and like vehicles, wherein a pneumatic or other resilient cushion is interposed between the hub and the rim of the wheel.

With this end in view the invention consists, broadly stated, in so mounting an inflated air cushion or other suitable resilient member between the hub and the rim that the vertical or diametrical movement of one with respect to the other, due to the load upon the hub and the reaction on the rim, will be converted into a horizontal or lateral pressure upon the interposed resilient member.

It also comprises the novel features of construction, arrangement, and combinations of parts hereinafter described and more particularly pointed out in the claims.

In the accompanying drawings, Figure 1 is a section on the line 1—1 of Fig. 2, and Fig. 2, a plan, partly broken away, of a wheel illustrating one embodiment of my invention; Figs. 3 and 4, sectional views illustrating two modified forms of wheels embodying the invention, and Fig. 5, a broken detail of the wheel shown in Fig. 4.

Referring first to the wheel shown in Figs. 1 and 2, 10 designates the hub upon which are rigidly mounted two outer annular plates 11, having inwardly projecting peripheral flanges. The rim 15 and side rim plates 16, carrying the usual solid rubber or other suitable tire 17, are slidingly mounted between annular washers 14 which are held in place by the peripheral flanges of the outer plates. An annular rubber bag or chamber 18, mounted between two annular plates 22, suitably inflated, as by means of the usual valved stem 19 extending outwardly through the hole 25 in one of the side plates and hole 13 in the corresponding outer plate, forms a pneumatic cushion which bears at its periphery against the inside of the rim. The central opening 20 of this cushion member as well as central openings 23 in the two side plates, is of a size sufficient to allow the hub to move diametrically therein as required. The outer plates 11 and inner side plates 22 are alternately connected, the outer plate on one side with the inner plate on the opposite side of the wheel, by means of ball joint connectors 28, the two heads of which bear in socket plugs 26 secured in holes 12 and 24 in the outer and inner plates respectively, forming therewith ball and socket joints.

When the wheel is in use, the two opposing forces, the load supported by the hub and the reaction of the rim through the tread of the tire, will tend to bring these two parts together and so produce a diametrically opposite movement of the hub and outer plates on the one hand and of the rim, pneumatic cushion and inner side plates on the other hand, the movement of the outer plates relative to the inner side plates will force the ball joint connectors from their normal position perpendicular to the plates to an angular position and thereby draw these two plates inward toward each other and compress the pneumatic cushion between them. A cushion suspension of the hub is thus secured in which a vertical or diametrical pressure between the hub and the rim is converted into a lateral pressure upon the interposed cushion member.

In the modified form of wheel shown in Fig. 3, the hub 30, outer plates 31, washers 32, rim 33, side rim plates 34, and tire 35, are all constructed and arranged as already described. A central annular plate 36 is rigidly mounted upon the hub and a narrow annular plate 37 is similarly mounted on the inside of the rim, a space being left between the periphery of the former plate and the inner edge of the latter to allow a diametrically opposite movement of one with respect to the other. Two annular pneumatic cushions 39—40 are placed between the opposite sides of the central hub plate and two inner side plates 41, which side plates are mounted upon the hub to move longitudinally and to rotate or not as desired thereon and at their peripheries are both connected with the central rim plate by ball joint connectors 43 bearing in sockets 38 and 42 formed respectively in the central rim and inner side plates. As thus constructed, the outer plates, inner side plates and central hub plate all share in the movement of the hub within the rim, and the opposite movement of the two inner side plates relative to the central rim plate inclines the ball joint connectors and thereby draws these plates together to press the pneumatic cushions against the central hub plate.

In the second modification, shown in Figs. 4 and 5, the outer plates 51, mounted upon the hub 50, carry at their peripheries an inner rim 53, and the annular washers 54. The side plates 57 of the outer rim 56, carrying the tire 59, are extended inwardly toward the hub, leaving a central opening which is of sufficient size to allow the necessary movement of the hub therein and is closed by annular flanges 65 mounted upon the hub. A pneumatic cushion 60 bears at its periphery against the inner rim and projections 61 thereon, fitting in slots 55 in the inner rim, insure the same rotary movement for both of these parts. The two inner plates 62, bearing against the sides of the pneumatic cushion, are forced inwardly toward each other and compress the cushion, whenever the hub moves up or down relatively to the outer rim, by the wedge action of the balls 63 upon the oppositely tapered walls of bearings formed by a series of inwardly opening conical cups 58 on the side rim plates in coöperation, through openings 52 in the outer plates, with a corresponding series of outwardly opening conical cups 64 on the inner side plates.

Of the many advantages due to my improved construction it may be mentioned that the greater area of pressure afforded by the sides of the air chamber permits a much lower compression of the air therein than that heretofore required where the pressure was applied to the periphery of the intermediate air chamber and thus reduces the danger of rupture to a minimum.

While I have explained the principle of my invention and specifically described those forms which I now consider to be the best forms for the embodiment thereof, it will be understood that these forms may be variously modified in their details and other forms devised without departing from the spirit or sacrificing the advantages thereof.

What I claim as new, and desire to secure by Letters Patent, is—

1. A wheel comprising a rim, a hub mounted to move diametrically therein, an annular resilient member intermediate the rim and hub, two annular side plates attached to the rim, two annular side plates attached to the hub and making sliding contact with the rim plates, two annular inner plates bearing against the sides of the annular resilient member, and operative connections between the side plates and the inner plates whereby the movement of the hub within the rim is converted into and limited by a lateral pressure upon the annular resilient member.

2. A wheel comprising a rim, a hub mounted to move diametrically therein, two annular plates attached to the rim, two annular plates attached to the hub and making sliding contact with the rim plates, an annular air-cushion interposed between the rim and hub within the inclosed chamber formed by the rim and hub plates, two inner annular plates bearing against the sides of the air-cushion, and operative connections between the rim plates and the inner plates whereby the movement of the hub within the rim is converted into and limited by a lateral pressure upon the air-cushion.

RALPH K. GRATIGNY.

Witnesses:
 WM. B. WHITNEY,
 MAY FREVERT.